UNITED STATES PATENT OFFICE.

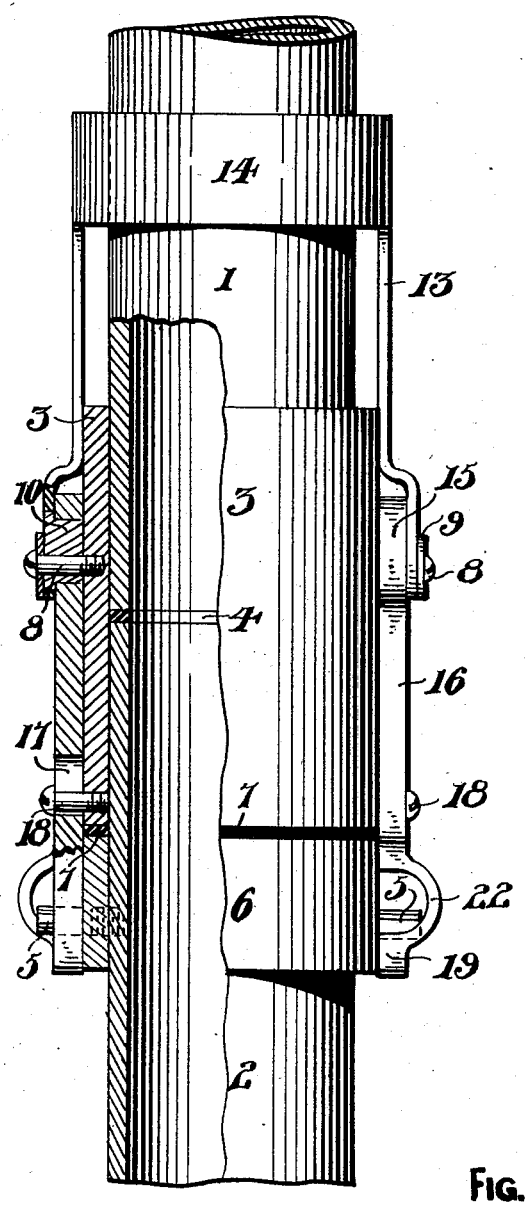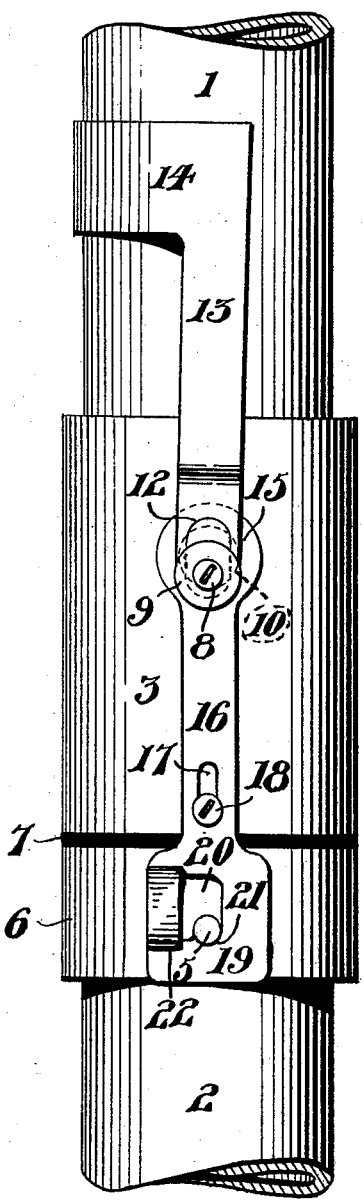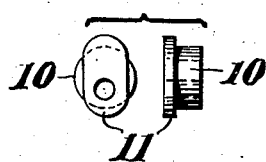

CHARLES A. SMITH, OF SCALP LEVEL, PENNSYLVANIA.

PIPE-COUPLING.

1,068,943.      Specification of Letters Patent.      Patented July 29, 1913.

Application filed April 12, 1913. Serial No. 760,810.

*To all whom it may concern:*

Be it known that I, CHARLES A. SMITH, a citizen of the United States of America, residing at Scalp Level, in the county of Cambria and State of Pennsylvania, have invented certain new and useful Improvements in Pipe-Couplings, of which the following is a specification, reference being had therein to the accompanying drawing.

This invention relates to a pipe coupling, and the primary object of my invention is the provision of positive and reliable means, in a manner as hereinafter set forth, for easily and quickly connecting the confronting or abutting ends of pipes to provide a non-leakable connection.

Another object of this invention is to provide a coupling that can be advantageously used for quickly connecting the ends of hose, particularly fire hose.

A further object of this invention is to provide a pipe coupling consisting of comparatively few parts that are inexpensive to manufacture, durable, easy to assemble and highly efficient for the purposes for which they are intended.

With the above and other objects in view the invention resides in the novel construction, combination and arrangement of parts to be hereinafter specifically described and then claimed.

Reference will now be had to the drawing, wherein:—

Figure 1 is a plan of the pipe coupling, partly broken away and partly in section. Fig. 2 is a side elevation of the same, and Fig. 3 illustrates details of an eccentric forming part of the coupling.

Further describing the invention in detail with reference to the accompanying drawing, wherein like numerals denote corresponding parts throughout: 1 and 2 denote, by the way of an example, the ends of pipes and shrunk or otherwise mounted upon the end of the pipe 1 is a sleeve 3 that projects from the end of the pipe 1 to receive the end of the pipe 2, and a gasket 4 can be interposed between the ends of said pipes to form a non-leakable connection.

Mounted upon the end of the pipe 2, preferably by diametrically opposed screws or pins 5 is a band 6 and interposed between said band and the end of the sleeve 3 is a gasket 7. The pins 5 project from the sides of the band 6, for a purpose that will presently appear.

Diametrically opposed sides of the sleeve 3 are provided with bearings 8, preferably in the form of screws and arranged upon these bearings are washers 9 and eccentric members 10, said members having elongated enlargements 11. The enlargements 11 fit in openings 12 provided therefor in the ends of arms 13, said arms being connected by a yoke 14.

Loosely mounted upon the eccentric members 10 are the enlarged ends 15 of coupling links 16, said links being slotted, as at 17 to receive screws 18 employed for movably holding said links upon diametrically opposed sides of the sleeve 3. The ends of the links 16 are enlarged, as at 19 and provided with slots 20, the slot of one link being the reverse of the slot of the other link, whereby the pins 5 can be swung into said slots and engage in seats 21 provided therefor in the walls of said slots. The open ends of the slots 20 are bridged by integral straps 22 that reinforce and strengthen the ends of the links 16.

When the yoke 14 is raised or at right angles to the sleeve 3, the links 16 are in an extended position. The end of the pipe 2 can be inserted in the end of the sleeve and partially rotated whereby the pins 5 will engage in the slots 20. The yoke 14 can then be lowered, whereby the eccentric members 10 will retract the links 16 and place the pins 5 in the seats 21. In locking the pipes together in this manner the gaskets 4 and 7 are compressed and a non-leakable connection established between said pipes.

The coupling in its entirety can be made of light and durable metal and while one embodiment of my invention has been illustrated, it is to be understood that the structural elements are susceptible to such changes as fall within the scope of the appended claims.

What I claim is:—

1. A pipe coupling comprising a sleeve adapted to be secured to and project from the pipe section, a band adapted to be mounted upon the opposing pipe section, pins securing said band in position and projecting therefrom, circular members eccentrically connected to said sleeve and provided with oval-shaped enlargements, a yoke having the free ends of its arms mounted upon said members and formed with openings in which extend said enlargements, links loosely surrounding said members below said enlargements and slidably connected to said sleeve, said links provided with means engaging with said pins for coupling the band and sleeve together.

2. A pipe coupling comprising a pipe, a sleeve fixed thereto, a pipe adapted to extend in said sleeve, a band carried by the last mentioned pipe, circular members eccentrically pivoted to said sleeve and formed with oval-shaped enlargements, a yoke having its arms connected to said sleeve and provided with openings into which extend said enlargements, pins projecting from said band, links loosely mounted upon said members, said enlargements overlapping the links for maintaining them in position, said links provided with seats for the reception of said pins whereby the sleeve and band are coupled together, said yoke constituting means for shifting the links into and out of engagement with said seats.

3. A pipe coupling comprising a pipe, a sleeve fixed thereto, a pipe adapted to extend in said sleeve, a band carried by the last mentioned pipe, circular members eccentrically pivoted to said sleeve and formed with oval-shaped enlargements, a yoke having its arms connected to said sleeve and provided with openings into which extend said enlargements, pins projecting from said band, links loosely mounted upon said members, said enlargements overlapping the links for maintaining them in position, said links provided with seats for the reception of said pins whereby the sleeve and band are coupled together, said yoke constituting means for shifting the links into and out of engagement with said seats, and means for slidably connecting said links to said sleeve.

In testimony whereof I affix my signature in the presence of two witnesses.

CHARLES A. SMITH.

Witnesses:
C. F. GUSTAFSON,
FRED LINDSTROM.

Copies of this patent may be obtained for five cents each, by addressing the "Commissioner of Patents, Washington, D. C."